United States Patent [19]

Mafnas

[11] 3,999,241
[45] Dec. 28, 1976

[54] VEHICLE REAR WINDSHIELD WIPER DEVICE

[75] Inventor: Elias T. Mafnas, Oakland, Calif.

[73] Assignee: The Raymond Lee Organization, Inc., New York, N.Y.; a part interest

[22] Filed: Jan. 23, 1976

[21] Appl. No.: 651,897

[52] U.S. Cl. .................... 15/250.21; 15/250.3; 74/405

[51] Int. Cl.² .......................... B60S 1/26

[58] Field of Search ..... 15/250.14, 250.16, 250.17, 15/250.21–250.3; 74/25, 405

[56] References Cited

UNITED STATES PATENTS

| | | | |
|---|---|---|---|
| 1,270,197 | 6/1918 | Parker | 15/250.21 |
| 1,584,821 | 5/1926 | Sparks | 15/250.3 |
| 2,172,488 | 9/1939 | Waters | 150/250.21 |
| 2,748,617 | 6/1956 | Deibel | 74/405 |
| 3,397,589 | 8/1968 | Moore | 74/405 X |

*Primary Examiner*—Peter Feldman
*Attorney, Agent, or Firm*—Daniel Jay Tick

[57] ABSTRACT

A wiper blade is pivotally coupled to a rotatably mounted main gear via a wiper arm and abuts the rear window of a vehicle. First and second gear rods are provided in spaced parallel coplanar flanking relation with the main gear. First and second worm gears are affixed to first ends of the first and second worm gear rods, respectively, each on a corresponding side of the main gear. A pivotally mounted support device supports the gear rods with the first and second worm gears on diametrically opposite sides of the main gear. A drive device is coupled to the gear rods for rotating the first and second worm gears. An electromagnetic control device is coupled to the support device for alternately moving the first and second worm gears into coupling relation with the main gear thereby alternately rotating the main gear clockwise and counterclockwise and moving wiper blade in a wide arc.

3 Claims, 5 Drawing Figures

VEHICLE REAR WINDSHIELD WIPER DEVICE

BACKGROUND OF THE INVENTION

The present invention relates to a vehicle rear windshield wiper device. More particularly, the invention relates to a vehicle rear windshield wiper device for a vehicle having a rear window.

Objects of the invention are to provide a vehicle rear windshield wiper device of simple structure, which is inexpensive in manufacture, installable with facility in new and existing vehicles, and functions efficiently, effectively and reliably to provide a wide arc windshield wiping function for the rear window of a vehicle.

BRIEF DESCRIPTION OF THE DRAWINGS

In order that the present invention may be readily carried into effect, it will now be described with reference to the accompanying drawings, wherein.

DETAILED DESCRIPTION OF THE INVENTION

Figures 1, 2, 3, 4, 5:
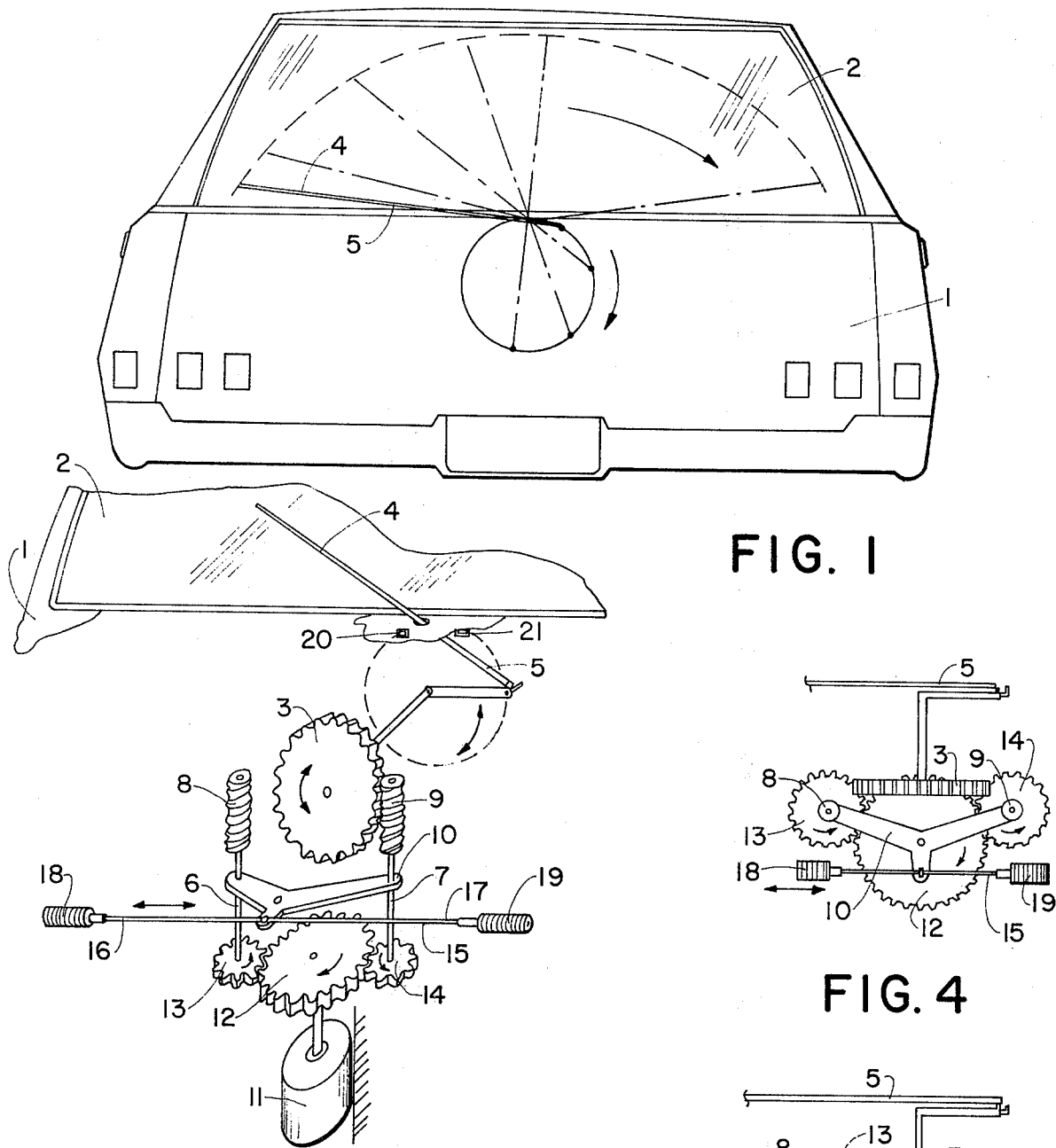
FIG. 1 is a view of a rear window of a vehicle utilizing the windshield wiper device of the invention.
FIG. 2 is a perspective view of an embodiment of the vehicle rear windshield wiper device of the invention.
FIG. 3 is a circuit diagram of the vehicle rear windshield wiper device of the invention.
FIG. 4 is a top view of the embodiment of FIG. 2.
FIG. 5 is a schematic diagram explaining the operation of the embodiment of FIG. 2.

The vehicle rear windshield wiper device of the invention is for a vehicle 1 having a rear window 2 (FIGS. 1 and 2).

The windshield wiper device of the invention comprises a rotatably mounted main gear 3 (FIGS. 2, 4 and 5).

A wiper blade 4 is pivotally coupled to the main gear 3 via a wiper arm 5 (FIGS. 1 and 2) and abuts the rear window 2 of the vehicle 1. First and second gear rods 6 and 7 (FIG. 2) are provided in spaced parallel substantially coplanar flanking relation with the main gear 3.

First and second worm gears 8 and 9 (FIGS. 2, 4 and 5) are affixed to first ends of the first and second gear rods 6 and 7, respectively, each on a corresponding side of the main gear 3.

A pivotally mounted support member or bell crank 10 (FIGS. 2, 4 and 5) supports the gear rods 6 and 7 with the first and second worm gears 8 and 9 on diametrically opposite sides of the main gear 3.

A drive device is coupled to the gear rods 6 and 7 for rotating the first and second worm gears 8 and 9 in the same direction about the axes of said gear rods. The drive device comprises a motor 11 (FIGS. 2 and 3). A drive gear 12 (FIGS. 2, 4 and 5) is coupled to, and driven by, the motor 11. A first planetary gear 13 is affixed to a second end of the first gear rod 6 and coupled to and driven by the drive gear 12, as shown in FIGS. 2, 4 and 5. A second planetary gear 14 is affixed to a second end of the second gear rod 7 and coupled to and driven by the drive gear 12, as shown in FIGS. 2, 4 and 5.

An electromagnetic control device is coupled to the support member or bell crank 10 for alternately moving the first and second worm gears 8 and 9 into coupling relation with the main gear 3 thereby alternately rotating the main gear clockwise and counterclockwise and moving wiper blade 4 in a wide arc, as shown in FIG. 1. The electromagnetic control device comprises a control linkage 15 (FIGS. 2, 4 and 5) affixed to the bell crank 10 at its center point and having first and second opposite ends 16 and 17 (FIG. 2). A first solenoid device 18 is provided in operative proximity with the first end 16 of the control linkage 15 (FIGS. 2, 4 and 5). A second solenoid device 19 is provided in operative proximity with the second end 17 of the control linkage 15 (FIGS. 2, 4 and 5). The first and second solenoids 18 and 19 are shown in FIG. 3. As shown in FIGS. 2 and 3, a pair of switch devices 20 and 21 are operated by the wiper arm 5 for alternately energizing the first and second solenoid devices 18 and 19, respectively. An ON-OFF switch 22 controls the energization of the motor 11 from a source of electrical energy 23 which may comprise the battery of the vehicle 1.

In operation, when the wiper arm 5 is at one end of its arc and contacts the switch device 20, the first worm gear 8 is moved into coupling engagement with the main gear 3 by energization of the first solenoid 18, and the wiper arm is rotated by said main gear in a clockwise direction until it reaches the other end of its arc and contacts the second switch device 21. When the wiper arm 5 contacts the second switch device 21, the second worm gear 9 is moved into coupling engagement with the main gear 3 by energization of the second solenoid 19 and said main gear moves the blade arm in a counterclockwise direction until it returns to the end of its arc adjacent the first switch device 20. The cycle is then repeated.

While the invention has been described by means of a specific example and in a specific embodiment, I do not wish to be limited thereto, for obvious modifications will occur to those skilled in the art without departing from the spirit and scope of the invention.

I claim:

1. A vehicle rear windshield wiper device for a vehicle having a rear window, said windshield wiper device comprising
    a rotatably mounted main gear;
    a wiper blade pivotally coupled to the main gear via a wiper arm and abutting the rear window of a vehicle;
    first and second gear rods in spaced parallel substantially coplanar flanking relation with the main gear;
    first and second worm gears affixed to the first ends of the first and second gear rods, respectively, each on a corresponding side of said main gear;
    pivotally mounted support means supporting the gear rods with the first and second worm gears on diametrically opposite sides of the main gear;
    drive means coupled to the gear rods for rotating said first and second worm gears; and
    electromagnetic control means coupled to the support means for alternately moving the first and second worm gears into coupling relation with the main gear thereby alternately rotating said main gear clockwise and counterclockwise and moving said wiper blade in a wide arc.

2. A vehicle rear windshield wiper device as claimed in claim 1, wherein said drive means comprises a motor, a drive gear coupled to and driven by the motor, a first planetary gear affixed to a second end of the first gear rod and coupled to and driven by the drive gear and a second planetary gear affixed to a second end of the second gear rod and coupled to and driven by the drive gear.

3. A vehicle rear windshield wiper device as claimed in claim 1, wherein the support means comprises a bell crank and the control means comprises a control linkage affixed to the bell crank and having first and second spaced opposite ends, a first solenoid device in operative proximity with the first end of the linkage, a second solenoid device in operative proximity with the second end of the linkage, electrical energizing means, and switch means operated by the wiper arm for alternately energizing the first and second solenoid devices.

* * * * *